Patented Nov. 15, 1949

2,488,439

UNITED STATES PATENT OFFICE 2,488,439

PRODUCTION OF TITANIUM OXIDE PIGMENTS

Holger Heinrich Schaumann, Newark, Del., assignor to E. I. du Pont de Nemours & Company, Wilmington, Del., a corporation of Delaware No Drawing. Application March 9, 1946,
Serial No. 653,428

10 Claims. (Cl. 23—202)

This invention relates to the production of pigment-useful titanium dioxide and to novel methods for obtaining that product. More particularly it relates to the production of $TiO_2$ pigments by the oxidation under controlled conditions of titanium tetrachloride while in the gaseous phase.

Titanium dioxide has been prepared in the laboratory by reacting titanium tetrachloride in the vapor phase with an oxygen-containing gas and by a so-called steam-splitting reaction. However, these prior oxidation processes lack technical importance and are neither adaptable to nor feasible for commercial exploitation. Thus, such methods entail a very difficult, costly and discontinuous type of operation, while the titanium dioxide resulting therefrom is decidedly lacking in essential pigment properties, e. g., its tinting strength is so poor and its particle size so coarse and of such wide, non-uniform distribution that it completely fails to meet the stringent requirements and demands of the trade with respect to $TiO_2$ pigments. Furthermore, these methods fail to afford a process in which the crystalline form of the titanium dioxide produced can be controlled at will, and require the use of large excesses of oxygen to convert the tetrachloride. This results in undesired contamination of the gaseous chlorine simultaneously formed with the $TiO_2$ to render such chlorine unfit for reuse in the process.

It has been found that the above and other disadvantages of prior vapor phase oxidation methods for $TiO_2$ preparation can be effectively remedied, and a principal object of this invention, therefore, is to provide novel methods and means for attaining that result. Particular objects of the invention include: the provision of a useful and efficient method for obtaining titanium oxide, through vapor phase oxidation of titanium tetrachloride, of controlled, uniform particle size and other necessary pigment qualities, including essential color, tinting strength, opacity, hiding power, etc., and which is directly useful as an excellent, high-quality type of pigment; the provision of a novel method for obtaining such pigment-useful titanium dioxide in either the rutile or anatase crystalline form and by an accelerated, controlled oxidation reaction; the provision of a process wherein the reaction between oxygen and the titanium tetrachloride is effected in such manner that the use of large excesses of oxygen is effectively avoided and substantially complete conversion of the tetrachloride is obtained; and the provision of a process wherein the chlorine produced in the reaction is substantially free from oxygen and other impurities to become suitable for direct use and recycling in the process to obtain further quantities of the titanium tetrachloride reactant or otherwise. Further objects and advantages will become apparent from the following, more detailed description of the invention.

These and other objects are accomplished in this invention which comprises producing pigment-quality titanium dioxide, in either the rutile or anatase crystalline form, by decomposing titanium tetrachloride in the vapor phase under controlled oxidation conditions in the presence of small, regulated amounts of water vapor.

In a more specific and preferred embodiment, the invention comprises producing pigment-quality $TiO_2$, more especially rutile, by reacting at an elevated temperature in the vapor phase and over a controlled time period relatively pure titanium tetrachloride with an oxygen-containing gas, and effecting said reaction in the presence of from 0.1% to 5% by volume (based on the total volume of gases) of water vapor to continuously form in situ of said reactants small amounts of an effective $TiO_2$ nucleating agent which promotes and insures production of a high-quality $TiO_2$ pigment.

In producing pigment-quality rutile in accordance with one preferred, practical adaptation of the invention, sufficient pure, vaporized, anhydrous titanium tetrachloride and an oxygen-containing gas, such as air, suitably enriched with from .1%–3% of water vapor, are separately and continuously introduced into an oxidation zone wherein their rapid, thorough admixture and reaction is effected at substantially constant temperatures ranging from 900–1200° C., with substantially complete oxidation of the titanium tetrachloride occurring as a result. Prior to introduction, either or both reactants are preheated to a temperature sufficient to insure the prevalence on their admixture and reaction of a temperature within the range mentioned. Any conventional corrosion-resistant type of reaction vessel can be employed in the process, but such vessel should be of such design, construction and dimension that it will afford a continuous flow of the reactants and products within and through its oxidation chamber and permit of such control over the velocities, mixing rates, temperatures and retention times that, on the average, said reactants and products will remain in said chamber for only a limited, relatively short period of time, e. g., long enough to effect a substantially complete reaction but insufficiently long to permit undesired particle size growth of the $TiO_2$ to occur. Usually, a retention time of from about .1 to 1 second, using the indicated temperatures induces substantially complete conversion of the titanium tetrachloride to titanium dioxide.

The gaseous reaction products which contain the $TiO_2$ product in suspension, upon discharge from the oxidation chamber are subjected to quick cooling, such as by quenching, or otherwise, to reduce their temperature below 600° C. and prevent any undesired growth taking place of the pigment particles by cementation or sintering of loosely-bound $TiO_2$ aggregates. One useful and effective method for accomplishing this rapid cooling comprises recirculating cooled product gases from the system and directly commingling them with the gaseous $TiO_2$ suspension as it issues from the oxidation chamber. The quantity of cooled products thus employed should be sufficient to drop the temperature of the pigment suspension preferably below 600° C., in about 1 second and not to exceed 10 seconds' time. The rutile $TiO_2$ pigment can be recovered from such cooled gaseous products of reaction by means of conventional separatory treatments, including cyclonic or electrostatic separation, filtration through porous media, or the like. Said pigment will have an average particle size radius ranging from .05 to .5 micron, and preferably will range in average particle size radius from .1 to .25 micron. Such uniform, small particle size and the inherently high tinting strength, color, opacity, and other essential pigment properties possessed by the product render the pigment adaptable for use in all types of pigment application, including paints, enamels, finishes and other types of coating compositions, as a delusterant for rayon or other artificial fibers or silks, in printing inks, rubber, etc.

To a clearer understanding of the invention, the following specific examples are given, each being merely illustrative in character and not intended to limit the scope of the invention:

*Example I*

Liquid titanium tetrachloride was flash evaporated and preheated to 800° C. in a corrosion-resistant tubular preheater and the preheated vapor admitted continuously at a rate equivalent to 100 parts by weight of $TiCl_4$ per hour to the upper portion of a vertical, corrosion-resistant reaction chamber maintained at a temperature of 1050° C. Simultaneously therewith, air preheated in a similar fashion to about 800° C., and to which sufficient water vapor had been added to give .95% $H_2O$ content by volume, was continuously admitted through a separate inlet adjacent the $TiCl_4$ inlet to the upper portion of the reaction chamber. The metered, humidified air flow was maintained at a rate equivalent to 20 parts by weight of $O_2$ per hour. The separate inlets through which the reactants were admitted to the reaction zone were so arranged that the gas streams entering the reaction chamber converged immediately to become rapidly mixed together in the upper portion of said chamber. Flow rates sufficient to provide an average retention time of gases and products in the reaction zone of about .5 second were utilized. The gaseous suspension of titanium dioxide reaction product, issuing from the bottom of the reaction chamber at a temperature of approximately 1000° C., was quickly cooled by introducing sufficient cold chlorine gas therein to drop its temperature to 300° C. in less than 2 seconds. The titanium dioxide pigment product was then separated and recovered in filter containers. The process was operated continuously with over 99% conversion of the titanium tetrachloride taking place. The titanium dioxide product was determined to be in the rutile crystal structure and possessed essential particle size uniformity and other pigment properties, as shown by its possession of a tinting strength value of 182, a color value of 19, and an average particle size radius of 0.17 micron.

Duplication of the foregoing example, except that air substantially free from moisture was employed, failed to result in a satisfactory final titanium dioxide product, being of lower refractive index (anatase) and having an average particle size radius of 0.60, a tinting strength value of 75, and a color value of 17. It was too coarsely crystalline, non-uniform, and deficient in essential properties to be useful as a pigment.

*Example II*

In the same type of apparatus as that employed in Example I, titanium tetrachloride vapor was preheated to about 865° C. and admitted to the reaction chamber at a continuous rate of 100 parts by weight per hour. Oxygen gas, to which water, equivalent to .33% by volume of the total flow of reactants, had been added was likewise separately preheated to 865° C. and continuously admitted to the reaction chamber wherein it was rapidly admixed with the tetrachloride vapor. The metered oxygen flow was maintained at a rate of 19 parts by weight of $O_2$ per hour, and the flow rate of the total reactants was so controlled that their average retention time in the reaction chamber was .47 second. The temperature in the reaction chamber was maintained at about 1065° C. and the gaseous, $TiO_2$-containing reaction products, upon issuing therefrom, were cooled to below 600° C. in less than 10 seconds by passing the reaction products so discharged at high velocity through cooled tubes. Thereafter, the pigment was removed from the gas stream by means of a glass cloth filter bag.

From this operation it was found that substantially complete conversion of the titanium tetrachloride to titanium dioxide resulted, with coincident formation of a gaseous product of about 94% $Cl_2$ by volume. The recovered titanium dioxide was in the rutile crystalline structure and exhibited excellent particle size uniformity, having an average particle size of 0.175 micron radius. Its tinting strength value was 179, its color was 23, and its hiding power was equal to the highest quality commercially obtainable rutile titanium dioxide pigments.

Duplication of this example, but without recourse to addition of water vapor to the oxygen, resulted in an anatase product which was too coarse in particle size and too poor in uniformity and other properties to be acceptable for such use as a pigment. Its tinting strength was but 88, its color was 15, and its hiding power was wholly deficient.

Example III

In an apparatus similar to that used in Examples I and II, titanium tetrachloride vapor heated to 170° C. was admitted continuously at a rate of 1045 grams per hour to the oxidation chamber maintained at about 1000° C. by external heating. Air preheated to 170° C. and to which water vapor had been added to give a water content equivalent to 1.0% by volume was separately admitted to the oxidation chamber at a rate of about 640 liters per hour, measured at room temperature. The two gas streams were rapidly mixed in the upper portion of the oxidation chamber, and such flow rates of reactants were resorted to that the average retention time of reactants within the oxidation zone was about .99 second. The products of reaction, upon issuing from the lower portion of said chamber, were cooled in less than 10 seconds to below 600° C. Substantially complete conversion of the titanium tetrachloride was obtained with production of a high-quality anatase pigment having an optimum average particle size range and other essential pigment properties.

Duplication of this example, using the same flow rates and temperatures, etc., but employing moisture-free air, resulted in an extremely coarse-grained $TiO_2$ product wholly unsuitable for use as a pigment.

The $TiO_2$ pigment values given herein were determined in accordance with the methods described or referred to in U. S. Patents 2,253,551 and 2,046,054.

Although it is essential in producing pigment-quality $TiO_2$ under the invention that the temperatures, concentrations, and retention times resorted to must be controlled and correlated, it will be understood that the reactants, concentrations, volumes, ratios, temperatures, velocities, retention times, etc. used in the above examples are not to be taken as critical. Hence, due variation therefrom may be made without departing from the underlying principles and scope of the invention.

While air, humidified to the extent indicated, comprises a preferred type of useful oxygen-containing gas, other types and amounts of oxidizing gases containing free oxygen ($O_2$) and similarly moisture-enriched, can also be used, as can mixtures thereof. Examples of other useful gases include oxygen, oxygen-enriched air, or mixtures of oxygen or air with various inert gases.

Again, while I prefer to introduce the required concentration of water vapor into the reaction zone via the oxidizing agent, if desired other methods for insuring the presence of a sufficient $H_2O$ concentration during the vapor phase reaction can be resorted to. Since it is essential and critical to the invention that the water vapor be present in controlled amounts, any method designed to introduce the required quantity (or lower the amount, if too high) into the oxidizing gas or reaction zone is contemplated as useful in practicing the invention. For example, the required amount of water vapor can be continuously added, either directly to the reaction zone itself, or as a component of the oxidizing medium being fed thereto. Alternatively, it may be introduced with either or both reactants, or by first mixing part or all of the gaseous reactants and then incorporating the desired quantity of water vapor therein prior to feeding the mixture into the reaction zone. Incorporation of the requisite amount of water in the reactants being fed to the reaction zone can be effected in any desired manner, as by bubbling the oxidizing gas through the aqueous liquid body or by conveniently spraying it into the gas stream in the form of liquid or vapor (steam). For instance, a portion of the oxidizing gas can be saturated in this manner with water, in either the liquid or vaporized state, following which the saturated portion can be blended with the remaining dry portion of the reactant. Alternatively, the desired amount of water, in liquid or vapor state, or both, can be injected into or otherwise fed, intermittently or continuously, directly to the reaction zone to insure the presence of controlled amounts thereof during the oxidation reaction.

While water vapor in amounts ranging from .1-3% has been mentioned as preferred for use, other amounts ranging from, say, .05% to 5%, but not exceeding 10% (based on the total volume of gaseous reactants being fed to the reaction zone) can also be used, and comprise the contemplated practical limits of operation hereunder.

As noted, reaction zone temperatures ranging from 900-1200° C. are preferred for use herein, because optimum results have been found to accrue by reason thereof. If desired, higher or lower orders of temperature, say, from 800° C. to 1350° C., are also employable. These reaction zone temperatures can be readily obtained in a large scale or commercial type of operation by either separately preheating one or both reactants to an extent sufficient to insure on their admixture and reaction temperatures of the order indicated and are maintained by means of the heat generated from the oxidation reaction or through external heating of the reaction zone or vessel, whichever method is preferred. The temperatures mentioned above comprise those measured by a thermocouple extending through the walls of the reaction vessel and into the reacting gases.

Preheating the reactants can be effected by separately subjecting each to an equivalent heating temperature, or, if desired, the oxidizing gas may be preheated to a temperature above or below that to which the tetrachloride is subjected, whichever method is preferred. Any conventional equipment can be used in the preheating step, including any suitable type of electrical resistance apparatus or devices adapted to pass the reactants in direct or indirect heat exchange relationship with a heat-imparting medium. A useful type of heating apparatus comprises one in which the reactants pass over heat transfer surfaces heated directly by combustion of fuels or indirectly by circulation of a suitable heat transfer medium.

Normally, the titanium tetrachloride oxidation is effected under atmospheric pressures, but it may be carried out, if desired, under super or subatmospheric pressures. Similarly, any type or size of reaction vessel conforming to the scale of operation intended can be used in adapting the invention, equipment of such design and dimension as will permit a continuous flow of reactants through the reaction vessel, especially the oxidation chamber thereof, being preferred, whereby a continuous, as distinguished from a discontinuous or batch, type of operation, will be afforded. While a continuous type of process is preferred, the process can also be carried out as a batch or semi-continuous type of operation. The time of retention of reactants within the reaction zone is quite important and critical in the invention, especially in the production of pigment-quality TiO₂, as herein defined. In general, such retention time must not exceed about 5 seconds nor be less than about .01 of a second. A preferred time, to obtain an optimum quality pigment, ranges from .1 to 1 second.

As already noted, both anatase and rutile TiO₂ pigments can be produced in accordance with this invention.

In producing pigment rutile of optimum qualities, it is usually desirable to operate the TiCl₄ oxidation reaction under such combination of conditions that there will be employed (a) a minimum moisture concentration in the reacting gases to insure formation of rutile crystal structure TiO₂ pigment;

(b) minimum preheating temperatures for the reactants and thorough, rapid mixing of such reactants;

(c) minimum retention time of reactants and products in the oxidation chamber sufficient only to effect substantially complete conversion of the TiCl₄ to TiO₂ and growth of the TiO₂ pigment particles to the desired size; and (d) quickly cool the products from the oxidation after formation of the desired particle size TiO₂ to prevent over-growth of the pigment particles.

These variables are interdependent and optimum values, within the limits specified, for moisture content in the reacting gases, preheating and reaction zone temperatures and retention time in the oxidation chamber must be predetermined for a particular apparatus to obtain therefrom the desired particle size rutile pigment. The preferred relationship between these critical variables is dependent upon such factors as manner and speed of mixing of the reactants, size and shape of the oxidation chamber, etc., as well as upon the particle size desired in the pigment TiO₂.

It has been found, as already indicated, that the temperature to which the reactants are subjected in the preheating operation has an important bearing upon the ultimate type, crystallinity, and character of the TiO₂ pigment. In producing anatase, it is usually desirable to employ lower preheating temperatures with resulting lower reaction chamber temperatures than are resorted to and necessary in the production of rutile. The preferred, most useful temperature will depend upon such factors as the scale of the involved operation, the size and shape of the reaction chamber, and the rapidity with which gas mixing is effected. In producing rutile, preheating temperatures adequate to insure a mixed gas temperature of at least 350° C., and preferably above 400° C., are usually necessary, while in anatase production preheating temperatures sufficient to afford a mixed gas temperature ranging from below 350° C. to not lower than 100° C. can be resorted to. While a preheating temperature of at least 350° C. is suggested in rutile production, in general, and as already indicated, it will be found that as the size of a given operation increases, the amount or degree of preheating temperature required to effect such decreases. Hence, temperatures below that recommended and to as low as, say, 250° C., may be employed.

The titanium tetrachloride reactant preferred for use herein comprises a high-purity material to insure production of a product exhibiting exceptionally high pigment whiteness and brightness characteristics. This reactant can be obtained from any convenient source, as for instance through the chlorination of a titaniferous ore, such as ilmenite, followed by purification through careful fractional distillation to obtain the desired product. Examples of other utilizable titanium tetrachloride reactants comprise the pure, anhydrous titanium tetrachloride (freed of copper, vanadium, iron, and other impurities) contemplated in U. S. Patent 2,062,133, or the product which results from soya bean oil treatment disclosed in U. S. Patent 2,230,538.

Although chemically-equivalent concentrations of reactants are used herein and substantially complete conversion of the chloride to TiO₂ obtained as a result, in general I prefer to operate with amounts of oxidizing gas sufficient to provide about 10% excess oxygen over the theoretical so as to obtain a product gas containing about 30% Cl₂ by volume, when air is used as the source of oxygen, and 90-95% Cl₂ when gaseous oxygen is employed, with but small or minor amounts of O₂ and HCl. The use of oxygen-enriched air will produce chlorine concentrations intermediate between 30 and 90% Cl₂ gas in the oxidation products. However, the invention is not limited thereto, since it is susceptible of operation using either excess or deficient concentrations of the oxidizing or titanium tetrachloride reactant. In event an excess of the chloride is used, it can be separated from the oxidation products and reused in the system. Occasionally it may be desirable to operate the process with incomplete titanium tetrachloride conversion and such type of operation is likewise contemplated within the scope of the invention. Satisfactory titanium dioxide pigments have been produced hereunder with tetrachloride conversions as low as 50% of theoretical.

As already noted, in the commercial application of the invention any chlorine produced simultaneously with the titanium dioxide pigment can be conveniently recycled to produce more titanium chloride for oxidation. Consequently, a continuous, as distinguished from a non-continuous, type of operation is hereby afforded. The gaseous chlorine formed may be recycled directly from the pigment recovery operation or, if desired, may be concentrated prior to reuse in the chlorination operation. Such by-product chlorine can also be used for purposes other than chlorinating titaniferous materials, if that should be desired.

The products of reaction are most conveniently subjected to quick, rapid cooling by the recirculation of sufficient cooled product gases to instantaneously drop the temperature of the pigment suspension issuing from the reaction zone well below 800° C., and preferably below 600° C. Such cooling should be effected in less than 30, and preferably in less than 10, seconds' time. Other means for accomplishing cooling can be resorted to, such as quick quenching by spraying liquid chlorine into the oxidation products; impingement of the gaseous suspension on cold surfaces; rapid flow through cooled tubes, etc. Similarly, quenching with other gases, such as air, or with liquids other than chlorine can also be resorted to. The latter methods are less practical and hence are not preferred because undesired dilution may occur of the chlorine content of the gaseous products.

The precise manner by which the use and presence of the contemplated amounts of water vapor during the reaction induce production of the high-quality TiO₂ pigment obtainable hereunder is presently not clearly understood. It does appear, however, that under the controlled and regulated conditions of the reaction which prevail herein, the water vapor introduced into the reaction zone first forms extremely minute TiO₂ crystallites which are well dispersed throughout the gaseous mixture according to the reaction:

$$TiCl_4 + 2H_2O \rightarrow TiO_2 + 4HCl$$

Control over the size, crystalline form, and number of these nucleating particles is effected by the amount of water present during the oxidation reaction and the temperature conditions under which they are permitted to form. Under the prevailing, controlled conditions of reaction, nuclear TiO₂ or oxychloride particles of such minute size, number and type form continuously in the reaction chamber to provide throughout the oxidation of the titanium tetrachloride a continuous, fresh supply of seeding material onto which the TiO₂ from such oxidation precipitates to build up or grow into TiO₂ particles of desired pigment dimension, uniformity and crystalline structure. Low temperatures favor the formation of anatase nuclei while high temperatures promote rutile formation, and the nucleating particles function as "centers" for subsequent growth by TiO₂ deposition in the same crystalline form as the "centers" by the oxidation reaction:

$$TiCl_4 + O_2 \rightarrow TiO_2 + 2Cl_2$$

The average final particle size is then an inverse function of the number of nuclei, and the crystal variety (rutile or anatase) is determined by the type of seed crystallite formed in the first stages of the reaction. The present method of nucleation also serves to greatly accelerate the velocity of the oxidation rate at temperatures below 1000° C., which effect appears to be due to the large number of active "centers" present in the reacting mixture and resulting from the presence of controlled, small amounts of moisture. Hence, ultimate at-will production is assured of a high-quality TiO₂ pigment exhibiting either the anatase or rutile crystalline diffraction pattern on X-ray analysis. Quite surprisingly, this nucleating function and the production of a satisfactory TiO₂ product fails to exist when no control is exercised over the amount of H₂O present during the reaction, nor can a rutile type of product be obtained in the absence of such control and the combination therewith of the indicated temperature and reaction zone retention times.

In producing pigment-quality rutile, the nuclei formed or employed in the reaction zone preferably consist of minute, finely-divided rutile crystallites or particles. In the production of anatase, the nucleating particles may be either true anatase crystallites or particles, such as hydrated oxychlorides or the like, adapted to readily convert to anatase crystallites during the oxidation.

The nuclein employed herein are preferably formed, as shown in the examples, as the gases become mixed in the reactor. If desired, such nuclei may be formed externally of and prior to their admission into the oxidation reactor. The moisture or water vapor reacts with the chloride to form solid particles of titanium oxide or oxyhalide and the limitation of the amount of water admitted causes a suspension of solids which passes on as a gaseous fluid into the oxidation chamber, and which appear to serve as nuclei centers on which the titanium oxide grows. In forming the nuclei outside the reaction zone, a two-step operation may be resorted to, i. e., the nucleating particles of the desired crystalline form, size and number may be separately prepared and then dispersed in the reactant gases prior to the oxidation of any substantial quantity of the titanium tetrachloride. In such instances the nuclei are formed in a first stage and continuously carried into a second stage for thorough incorporation in and admixture with the major reactants.

By the terms "pigment quality" or "essential pigment properties," as used herein and in the appended claims, is meant a TiO₂ product possessing satisfactory properties in respect to color, tinting strength, texture, particle size, and other requisite pigment properties which render the product commercially useful in coating compositions (paints, enamels, varnishes, finishes, etc.), pigmenting paper, linoleum; the production of shoe cleaner preparation or as a delusterant for artificial silks, nylon, etc. Such titanium dioxide is considered as being at least substantially equal to the quality obtained from a titanium sulphate process used in the production of either commercial anatase or rutile. Such properties as color, tinting strength, hiding power, texture, and particle size are referred to in the above-mentioned U. S. Patents 2,253,551 and 2,046,054. An additionally important property quite significant in the manufacture of rutile pigment is that commonly referred to as carbon black undertone. The effect of the addition of carbon black to a white paint is found to vary considerably and in some cases a gray of bluish undertone is produced while in other instances a gray of reddish undertone results. The paints may be identical in content of the carbon black and white pigment such as titanium dioxide, but yet appear quite different to the eye, due to the difference in undertone. This is considered as due to a difference in particle size and/or particle structure. The bluish undertone appears to be characteristic of pigments of small particle size, while the reddish undertone is characteristic of pigments of larger and less uniform particle size, although the structure of the pigment particle may also exert an influence. In order to give numerical gradings or values to this property, an arbitrary scale has been set up by assigning a grading of zero to a commercial pigment produced by the process of U. S. Patent 2,253,551, which shows excellent durability in outside house paints and other exterior coating compositions, but is relatively large in particle size and exhibits a reddish undertone. Another pigment produced in accordance with the process of U. S. Patent 2,224,987, having a relatively small particle size and exhibiting a bluish undertone, was given a rating of 100. These pigments serve as the basis for an arbitrary scale for rating by comparison the pigments produced by the present invention. The paint trade in general desires the pigment of bluish undertone, i. e., pigments rated in the upper part of the range or having numerical gradings in excess of about 50. It is obvious that some pigments may be graded over 100 if they are more blue in undertone than the based pigment rated 100.

The carbon black undertones of pigments best suited for optimum durability in exterior paints are in general rated low and are found to have ratings in the lower half of the indicated range. Such pigments are more chalk-resistant and therefore desired even though a sacrifice in pigment properties, such as tinting strength and hiding power, due to a growth in particle size, may have resulted. These superior pigments are adapted to exterior use and may be rated low in some pigment properties in order to provide the desired durability but would not be desired for consumption in the manufacture of the highest quality interior finishes. It therefore follows that the optimum pigment properties for a given pigment depend, in some measure, on the type of application in which it is to be used.

I claim as my invention:

1. A process for producing a titanium oxide pigment which comprises reacting at an elevated temperature ranging from about 800–1350° C. and in the vapor phase titanium tetrachloride with an oxygen-containing gas in an oxidation zone, effecting said reaction within said zone over a reaction zone retention time period ranging from .01 to 5 seconds and in the presence of controlled, added amounts of water vapor ranging from .05% to 10% by volume, based on the total volume of gases being reacted, and recovering the resulting $TiO_2$ pigment.

2. A process for obtaining a titanium oxide pigment having an average particle size radius ranging from .05 to .5 micron and exhibiting on X-ray analysis the diffraction pattern of rutile, comprising reacting in the vapor phase in a reaction zone and over a reaction zone retention time period not to exceed 5 seconds at a temperature of at least 800° C. titanium tetrachloride and an oxygen-containing gas, effecting said reaction in the presence of controlled, added amounts of water vapor ranging from .05% to 10% by volume, based on the total volume of gases being reacted, and recovering the resulting rutile $TiO_2$ pigment.

3. A continuous process for producing pigment-quality titanium oxide which comprises reacting titanium tetrachloride with an oxygen-containing gas in the vapor phase and in a reaction zone maintained at temperatures above 1000° C., effecting said reaction over a reaction zone retention period of time ranging from .1 to 1 second, and in the presence of controlled added amounts of water vapor ranging from 0.1% to 3% by volume, based on the total volume of gases being reacted, promptly cooling the reaction products, and recovering the resulting $TiO_2$ pigment from the products of reaction.

4. A process for producing a titanium oxide pigment through the controlled vapor phase reaction of titanium tetrachloride with an oxygen-containing gas, comprising effecting said reaction at temperatures ranging from 800–1350° C. in the presence of from 0.05% to 10% of added water vapor by volume, based on the reactants, and in a reaction zone in which said reactants are allowed to remain for a period of from .01 to not to exceed 5 seconds, promptly removing the products of reaction from said zone and quickly cooling them to below 600° C., and then recovering the resulting $TiO_2$ pigment.

5. A process for producing pigment-quality titanium oxide through a controlled vapor phase reaction of titanium tetrachloride with an oxygen-containing gas, comprising effecting said reaction at a temperature above 1000° C. in the presence of from 0.05% to 10% by volume, based on the reactants, of added water vapor, in a reaction zone wherein the reactants remain for a period of from .01 to not to exceed 5 seconds, quickly removing and cooling to below 600° C. the products from the hot reaction zone after the reaction is substantially complete and before particle size growth of $TiO_2$ progresses outside the range of .1–.5 micron average radius, and then recovering the resulting $TiO_2$ pigment.

6. A process for producing pigment-quality rutile through controlled oxidation of titanium tetrachloride, which comprises reacting in the vapor phase and at temperatures ranging from 900–1200° C. pure, anhydrous titanium tetrachloride and an oxygen-containing gas after the separate preheating of at least one of said reactants to a temperature sufficient to provide a gas temperature on their admixture of at least 400° C., effecting said reaction in the presence of from 0.05% to 10% of added water vapor, by volume, based on the total volume of gaseous reactants, and in a reaction zone wherein said reactants remain for a period of from .05 to not to exceed 5 seconds, cooling the reaction products immediately upon their discharge from said reaction zone to a temperature below 600° C., and thereafter recovering the $TiO_2$ pigment from said reaction-cooled products.

7. A process for producing pigment-quality rutile which comprises continuously reacting in the vapor phase $TiCl_4$ and an oxygen-containing gas in the presence of a controlled quantity ranging from .1 to 10% by volume, based on the total volume of gases being reacted of added $H_2O$, preheating at least one of said gases to a temperature sufficient to provide a gas temperature on their admixture of at least 350° C. but below 1000° C., effecting said reaction in a zone maintained by the exothermal heat of the reaction at a temperature of above 1000° C. and wherein the reactants are retained for a period of time ranging from about .01 to 5 seconds, promptly removing the resulting reaction products from said zone, cooling the same to below 600° C. within from 1 to not to exceed 10 seconds after such removal, and recovering the $TiO_2$ pigment therefrom.

8. A process for producing pigment-quality rutile which comprises continuously reacting $TiCl_4$ and an oxygen-containing gas in the vapor phase in a reaction zone maintained at a temperature above 1000° C., in the presence of an amount of added $H_2O$ ranging from .1 to 10% by volume based on the total volume of gases being reacted and sufficient to effect a substantially complete reaction with development of essential properties in the $TiO_2$ reaction product within less than 1 second of retention time of reactants in said reaction zone, and then promptly removing the reaction products from said zone, cooling the same, and recovering the $TiO_2$ product therefrom.

9. A process for producing pigment-quality rutile which comprises continuously reacting $TiCl_4$ and an oxygen-containing gas in the vapor phase in a reaction zone maintained at a temperature above 1000° C., in the presence of an amount of added water vapor ranging from .1 to 10% by volume based on the total volume of gases being reacted and sufficient to effect a substantially complete reaction with development of essential properties in the $TiO_2$ reaction product within less than .2 of a second of retention time of reactants in said reaction zone, and then promptly removing the reaction products from said zone, cooling the same, and recovering the $TiO_2$ product therefrom.

10. A process for producing pigment-quality titanium oxide which comprises reacting in the vapor phase, and at temperatures above 1000° C., titanium tetrachloride with oxygen to which has been added an amount of $H_2O$ equivalent to from .01% to 10% by volume, based on the total volume of gases being reacted, effecting said reaction within a reaction zone over a time period of reactant retention ranging from .01 to 5 seconds, cooling the resulting reaction products to a temperature below 600° C. within not to exceed 10 seconds from the time of their discharge from said zone, and then separating and recovering the resulting TiO$_2$ pigment from the cooled products of reaction.

HOLGER HEINRICH SCHAUMANN.

REFERENCES CITED

The following references are of record in the file of this patent:

UNITED STATES PATENTS

| Number | Name | Date |
|---|---|---|
| 1,931,380 | Haber et al. | Oct. 17, 1933 |
| 2,347,496 | Muskat et al. | Apr. 25, 1944 |
| 2,394,633 | Pechukas et al. | Feb. 12, 1946 |
| 2,462,978 | Krchma | Mar. 1, 1949 |

FOREIGN PATENTS

| Number | Country | Date |
|---|---|---|
| 541,343 | Great Britain | Nov. 24, 1941 |